Sept. 26, 1933.    R. WINTZER    1,927,970
POWER PLANT
Filed Oct. 31, 1929    5 Sheets-Sheet 5

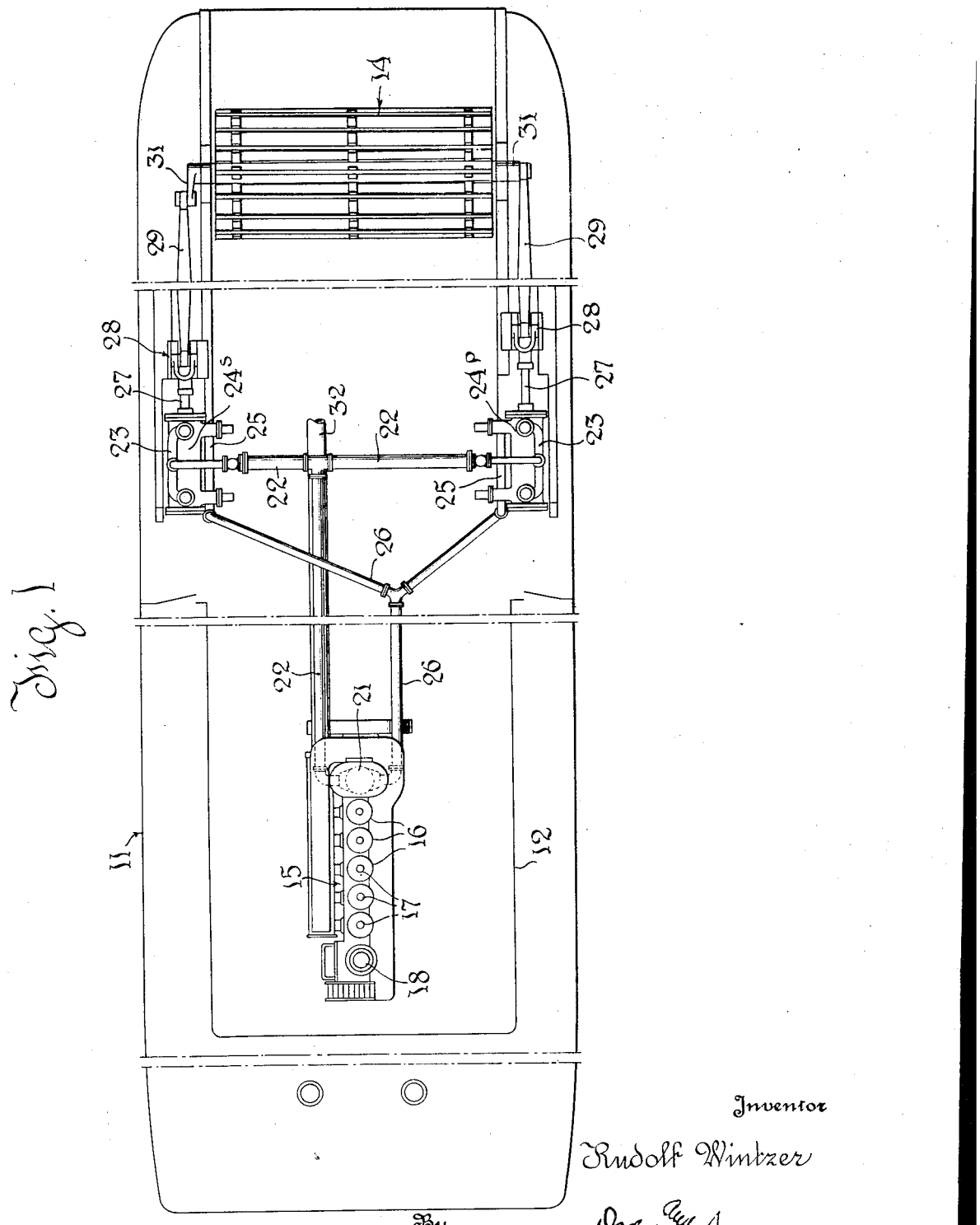

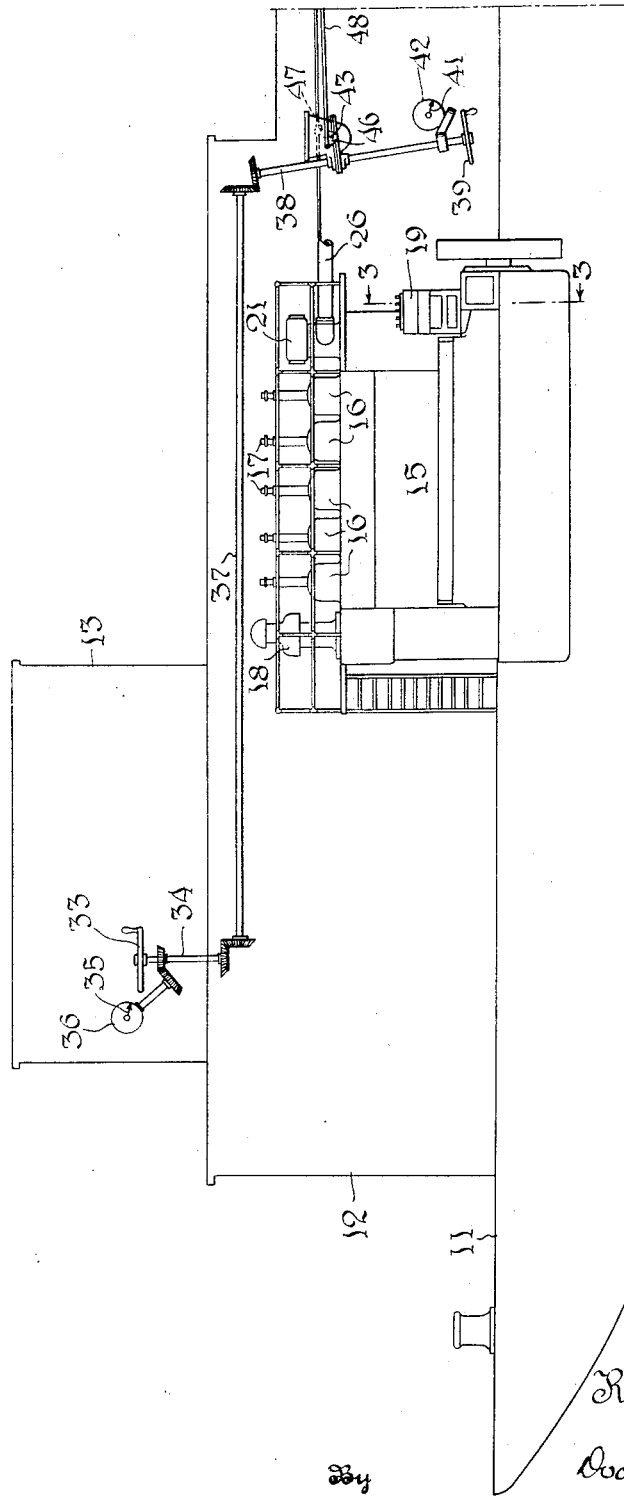

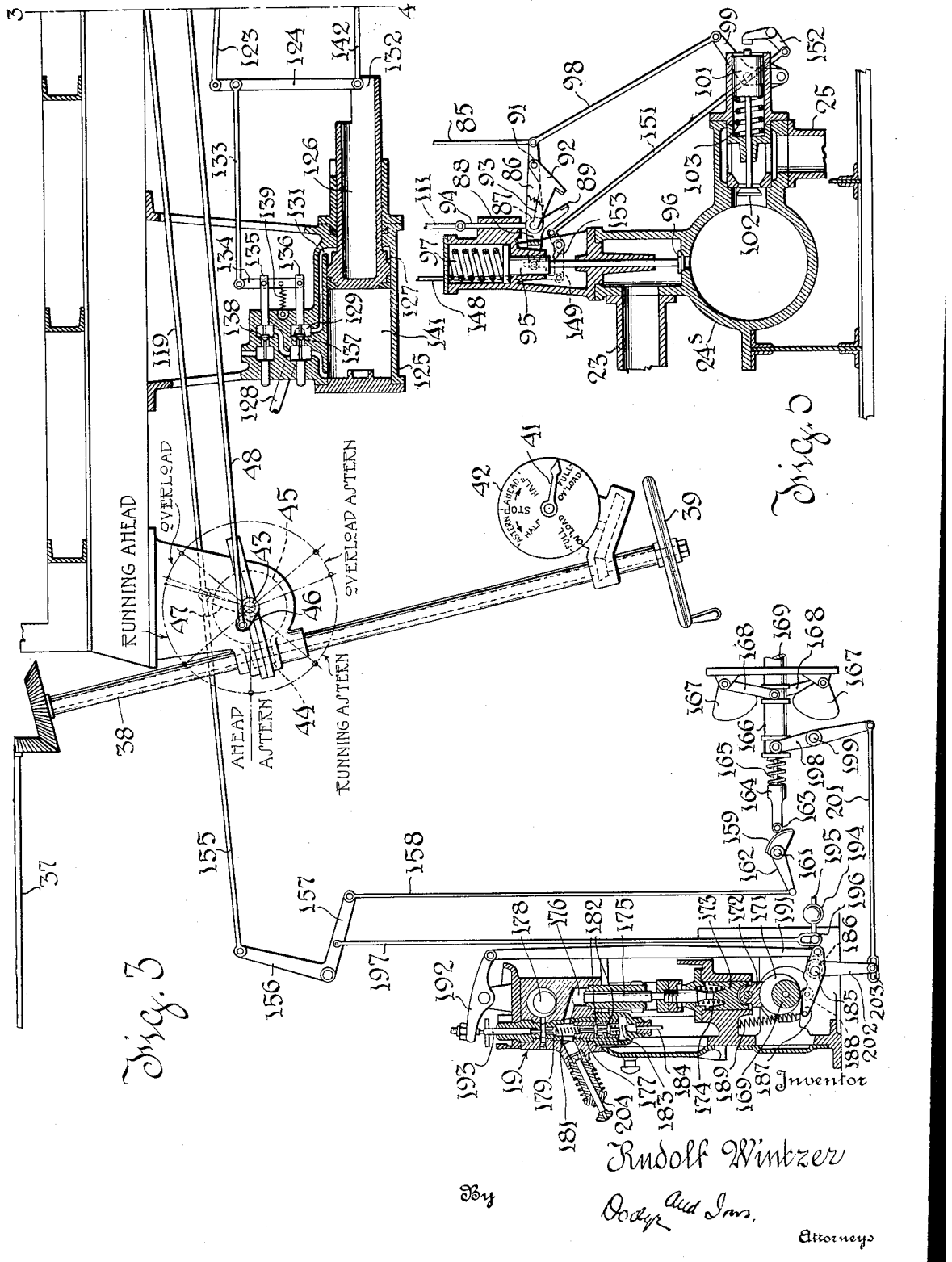

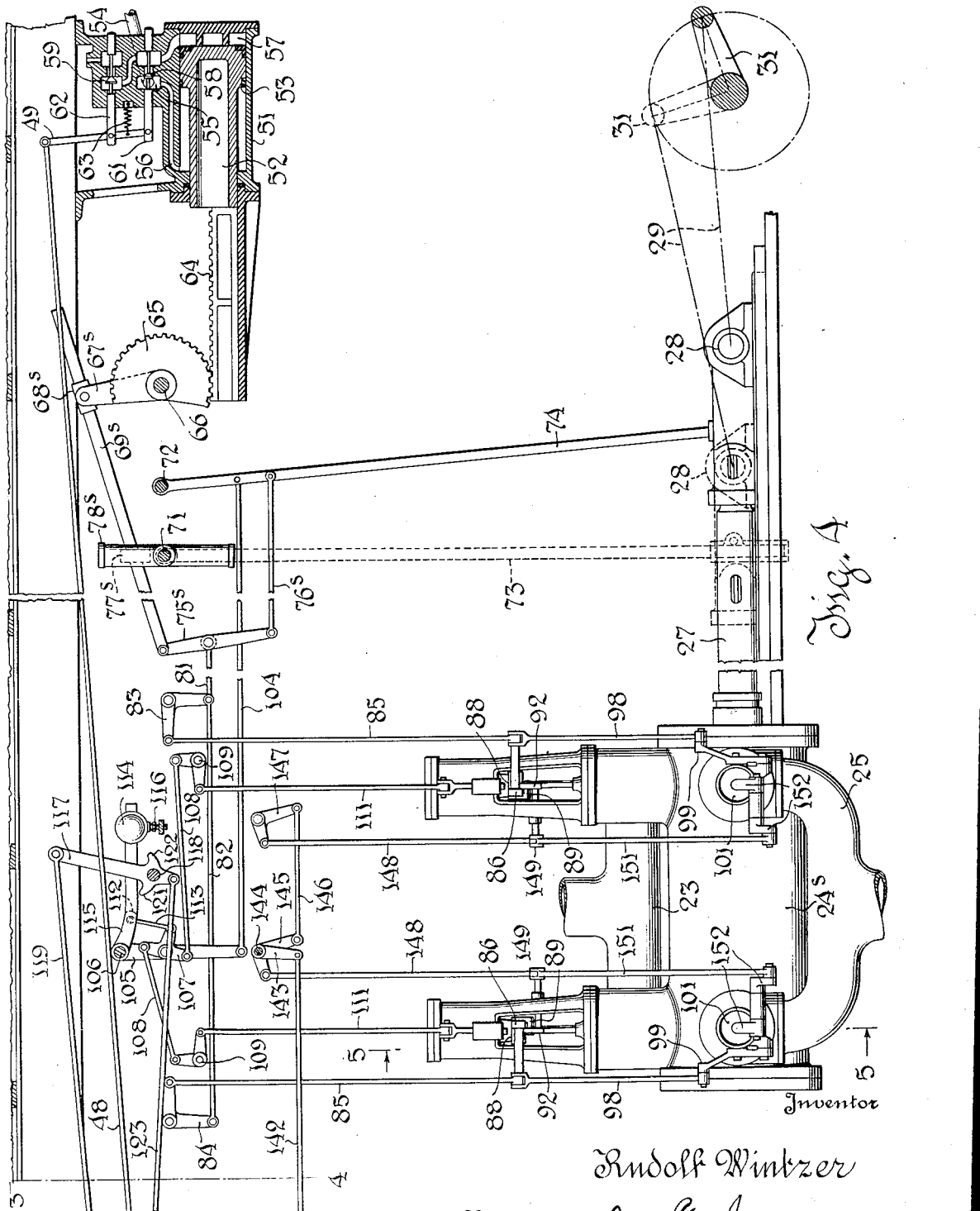

Inventor
Rudolf Wintzer
By Dodge and Sons
Attorneys

Patented Sept. 26, 1933

1,927,970

UNITED STATES PATENT OFFICE 1,927,970

POWER PLANT

Rudolf Wintzer, Milwaukee, Wis., assignor to Nordberg Manufacturing Company, Milwaukee, Wis., a corporation of Wisconsin Application October 31, 1929. Serial No. 403,852

18 Claims. (Cl. 60—19)

This invention relates to power plants, and particularly to a controlling mechanism for a power plant comprising a prime mover such as an internal combustion engine, for example, a Diesel engine, and a pneumatic transmission.

In the following description the engine will be referred to as a Diesel engine, because, under present conditions that type of engine will be used in most installations in which the advantages of the present invention would be desired. For lack of a better name the transmission will be referred to as a pneumatic transmission, without, however, any intention to limit the invention to the use of air as contradistinguished from other compressible gases. It is contemplated that this pneumatic transmission will be of what is colloquially termed the dense air type, by which is meant that the expansible gas used (usually air) flows in a closed cycle between the compressor and an expansion engine and is at all times at a pressure higher than atmospheric.

By adopting the dense air cycle, using a high pressure of say 280 pounds gage, and a low or return pressure of say 80 pounds gage, the expansion ratio is kept within reasonable limits, thus avoiding difficulties incident to frosting and the like.

No novelty for the dense air system is claimed in the present application and accordingly ancillary details of such system are omitted. For example, since the entire system is above atmospheric pressure, some leakage from the system will occur, and systems of this kind consequently include, among other auxiliaries, some means for supplying make-up air. Details of this character are not illustrated because not related to the subject of the present invention, but the necessity for them is recognized and various types are available from the prior art.

As is well known, Diesel engines and internal combustion engines generally, are limited in their speed range under load and are not readily reversible. The purpose of the pneumatic transmission is to provide a flexible and reversible drive, which will transmit power with minimum losses, and which is particularly adaptable for larger powers, and applicable to boats and other propelled devices.

The present invention also provides means to permit operation for short periods under overload conditions.

Generally stated, the power plant includes a Diesel engine, preferably a multiple cylinder engine of the air injection type, with fuel feeding pumps of the variable feed type. These pumps are not directly controlled by a governor, the primary control being manual. There is, however, a governor which acts to limit over speed and which is progressively loaded by the manual adjusting device so that the governor's response conforms at least approximately to the setting of the manual device.

The pneumatic transmission fundamentally consists of a compressor and an air motor. The compressor may conveniently be a single double-acting cylinder built as a unit with the Diesel engine. The air motor is provided with a variable cut off valve gear and with an unloading gear which permits the air line to be short-circuited at those times in which the Diesel engine is in operation and the air motor is at rest. The air motor should be self-starting and a convenient way of accomplishing this is to use two double-acting cylinders with cranks at 90°.

The invention is applicable to various installations, such as locomotives, ships and the like, but will be described as applied to a tow-boat of the stern paddle wheel type. For this purpose it is convenient to use a distributing gear of the drop cut off type, and an unloading gear which merely holds the inlet and exhaust valves of the cylinders open independently of the action of the distributing gear. When these valves are held open a free circulatory path is afforded through the air motor cylinders while the air motors are at rest.

The purpose of the present invention is to produce a single controller which will act simultaneously on the Diesel engine and on the air motor to give complete maneuvering control from rest to full speed in either direction.

To permit the description of the device to be understood as it proceeds, a brief statement of the control characteristics will be given.

With the air motors at rest, the Diesel engine will be operating at its minimum speed. The governor will be acting merely as an over speed device and the inlet and exhaust valves of the air motor will be held open and the air pump will be circulating air in a closed path, there being little difference in pressure between the low and high pressure lines. As the actuator is shifted "ahead" or "astern" from the stop position, it operates a servo-motor to set the valve gear for forward or reverse direction, and in the low speed positions the air motor valve gear is set for maximum cut off. Thus in low speed positions the compressor is being driven at low speed and the air motor is operating at a long cut off so that its air consumption is large and a relatively low pressure differential builds up between high pressure and low pressure air lines.

Thus the air engine starts slowly, but as the controller is moved toward half speed position, the Diesel engine is gradually speeded up and the cut off of the air engine is gradually shortened so that by the time half speed is reached, and preferably somewhat before it is reached, the air engine will be operating at its normal or minimum cut off so that the normal differential of pressure between the inlet and exhaust air lines is approached. Thereafter, the cut off of the air engine remains constant at the minimum setting to full speed, and the increase of speed in the air engine from half to full speed is secured solely by speeding up the Diesel engine.

To meet temporary overload conditions, it is possible to speed the Diesel engine up still further, but in order to use its power output effectively, it is desirable slightly to lengthen the cut off of the air engine and this is done so that as the controller is moved from full speed position forward to its limiting overload position the fuel feed to the Diesel engine is increased and the cut off of the air engine is progressively lengthened a moderate amount.

An embodiment of the invention illustrating the above parts will now be described in connection with the accompanying drawings, in which,—

Fig. 1 is a plan view of a tow-boat, partly broken away showing the position of the Diesel engine with its compressor, the position of the air motors and the main piping connections.

Fig. 2 is a vertical elevation of the Diesel engine and compressor and of the control mechanism from the pilot house to the power plant, the outline of the tow-boat being shown to indicate the position of these parts.

Figs. 3 and 4 are complementary views of the control mechanism, the two views being drawn to the same scale so that when joined on the line 3—4 they give substantially the complete layout. These views are to a certain extent diagrammatic. For example, instead of showing the engine, the fuel feed pump and its controlling mechanism including the governor are shown.

Fig. 5 is a section on the line 5—5 of Fig. 4.

Fig. 6 is a perspective view of the controlling mechanism shown in Figs. 3 and 4, with the exception of those parts which are associated directly with the Diesel engine. In this view supporting bearings are omitted, to avoid confusion.

Referring first particularly to Figs. 1 and 2, the hull of a tow-boat is represented in outline at 11, the deck house at 12 and the pilot house at 13. The usual stern paddle wheel is indicated at 14. This is intended to be typical of any member to or through which the power of the plant might be applied, it being the element which is driven at variable speed under load and which may be driven in reverse directions under the above stated conditions.

A Diesel engine is indicated generally by the numeral 15. It may be of any type, but in the example illustrated, it is assumed to be of the air injection, two cycle type, having five single acting cylinders. The upper portions of these cylinders are indicated at 16, and each has the usual fuel injecting nozzle and valve, indicated generally at 17.

A three-stage compressor for furnishing the injection air forms a part of such an engine and is shown at 18. The fuel feed pump appears at 19, and, as is common with such engines, is of the adjustable feed type, having five fuel feeding pumps, one for each of the cylinders 16. Each pump is piped to corresponding fuel injecting nozzles 17, in the usual manner, but these connections can not be shown on the small scale of the drawings.

21 shows an ordinary double-acting air pump designed to absorb the entire power output of the five cylinders 16. The pump delivers air to a high pressure line 22 which leads to the inlet manifolds 23 of two double-acting air cylinders 24p, 24s. These cylinders are counterparts of each other, but to simplify the explanation, will be distinguished by the subscripts p and s indicating "port" and "starboard" respectively.

The two cylinders 24p, 24s have exhaust manifolds 25 which are connected by the low pressure air line 26 with the suction or intake of the pump 21. Each air cylinder has the usual piston connected to piston rod 27 and cross head 28.

Connecting rods 29 form driving connections to corresponding cranks 31 on the shaft of the paddle wheel 14. The cranks 31 are set at 90° to each other so that the air engine is self-starting in both directions, it being understood that the cylinders are double-acting. Pipe 32 which appears in Fig. 1 is the exhaust pipe of the Diesel engine.

As already suggested there is a substantial advantage in using a closed circuit between the pump 21 and the air motor cylinders 24, but the present invention is directed to control and is not strictly limited to closed circuit operation. Some of the advantages of the invention at least can be secured by applying the novel control to that type of pneumatic transmission in which the compressor draws its air from the atmosphere and the air cylinders 24 exhaust to atmosphere. This is, in effect, a closed circuit in which the return from the air cylinders to the compressor is at atmospheric pressure.

Referring particularly to Fig. 2, there is in the pilot house 13 a power controlling wheel 33. This is mounted on a shaft 34 which is geared, as diagrammatically indicated in Fig. 2, to a hand 35 which indicates on a dial 36 the position of the controlling element. The shaft 34 is geared with a one-to-one ratio, to a horizontal shaft 37 which is geared with a one-to-one ratio to a controller shaft 38 in the engine room. The shaft 38 has an operating handle 39 and is geared to operate a hand 41 reading on a dial 42. The legends on the dial indicate the condition of the control mechanism. In mid-position it indicates "Stop". Reading successively from opposite sides of "Stop" position, there are indications for "Half speed", "Full speed" and "Overload", either "Ahead" or "Astern", as the case may be. Dial 36 bears corresponding legends.

The shaft 38 drives the main control shaft 43 through skew gears 44, 45, which appear in dotted lines in Fig. 3. This shaft carries at 90° to each other a short crank 46, which controls the reversing servo-motor, hereinafter described, and a longer crank 47, which controls the fuel feed of the Diesel engine, cut-off of the air engine, and the unloading gear.

In "stop" position the crank 47 extends to the left in substantially horizontal direction and the short crank 46 extends downward in a substantially vertical direction. The range of movement of the shaft 43 is about 120° in each direction from the "stop" position. For "ahead" motion it turns clockwise about 120°, and it follows that the end of crank 46 is to the left of shaft 43 in all forward settings.

For "astern" running the crank 47 swings through about 120° counterclockwise, and it follows that in all running "astern" settings the end of the short crank 46 is to the right of the shaft 43.

The crank 46 is connected by a reach rod 48 with a controlling lever 49 of the reversing servo-motor, and functions to cause this servo-motor to move from one extreme position to the other as the crank 46 passes through its vertical or "stop" setting.

The servo-motor consists of a cylinder 51 having a differential piston 52. The smaller or annular area 53 of the differential piston 52 is constantly subject to hydraulic pressure which arrives from any suitable source of supply, such as an accumulator, not shown, by way of pipe 54, valve chamber 55 and passage 56. Pressure in chamber 57 acts on the larger area of the differential piston 52 and is controlled by the simultaneous adjustment of two poppet valves, namely, an inlet valve 58 and an exhaust valve 59. These two valves are carried on plunger stems 61 and 62 which pass entirely through the valve casing, so as to be balanced.

The valves 58 and 59 seat in the same direction and their stems 61 and 62 are each pivoted to the lever 49. A spring 63 acts on the lever and holds both valves seated in the mid-position of the lever 49. If the upper end of the lever 49 is drawn to the left it fulcrums on its connection with plunger 61 and unseats the valve 59 and thus exhausts the pressure in chamber 57 so that the piston 52 moves to the right in the position shown in Fig. 4. This is the setting for running ahead and persists in all positions of the crank 46 to the left of its "stop" position. In the "stop" position both valves 58 and 59 are closed. If the upper end of the lever 49 is swung to the right of the "stop" position it fulcrums on its connection with stem 62, thus holding valve 59 closed and valve 58 open.

Under these conditions there is pressure in the space 57 and against the annular face 53 of the piston 52, but as the head area is much the larger, the piston 52 moves to the left to its limit of motion. This is the position for reverse running, and is the condition which persists whenever the crank 46 is to the right of its "stop" position.

Referring now to Fig. 6, as well as to Fig. 4, the piston 52 actuates a rack 64 which meshes with a sector gear 65 on shaft 66. Shaft 66 turns in bearings, (not shown) and carries at its opposite ends cranks 67p and 67s, indicating "port" and "starboard", to distinguish identical parts related to the port cylinder 24p and the starboard cylinder 24s. To these cranks are pivoted, respectively, guide blocks 68p and 68s, which receive and guide in longitudinal reciprocation, reversing links 69q, 69s.

There are two rock shafts 71, 72. The rock shaft 71 is driven through an arm 73 from the port cross-head 28. The rock shaft 72 is driven through an arm 74 from the starboard cross-head 28. The cranks, as already explained, are displaced 90° from each other.

The valve motions for the port cylinder 24p and for the starboard cylinder 24s are derived from respective combining links 75p, 75s. The link 75p derives its motion partly from the arm 73, through link 76p and partly through the member 69p which is pinned to a slide block 77p in the slotted guide member 78p which is mounted on shaft 72. The slotted guide member 78p is merely a cross guide permitting the block 77p to be shifted by motion of the crank 67p to a point above the center of the shaft 72 or a point below such center.

Similarly, the motion of the link 75s is a combined motion derived partly through the link 76s which is pinned to the arm 74, and partly through the member 69s which is pinned to a block 77s in a slotted guide member 78s mounted on the shaft 71, and in all respects similar to the slotted guide member 78p.

It will be remembered that the piston 52 moves from one limiting position to the other and this motion carries the blocks 77p and 77s from the top to the bottom of their respective slotted guide members.

From the links 75p and 76s to the inlet and exhaust valves of both cylinders, the two valve gears are identical, there being an independent gear for each end of each cylinder. The valve gear embodies the fundamental principles of that described and claimed in the patent to Emil Grieshaber, No. 1,735,045, dated November 12, 1929.

No distinguishing subscripts for port or starboard parts appear to be necessary.

The link 75p or 75s, as the case may be, is connected by links 81, 82, with bell cranks 83 and 84, the first of which handles the crank end valves, and the second of which handles the head end valves. Each of the bell cranks 83, 84, is connected by a corresponding link 85 with the admission and exhaust valve mechanism for one end of the cylinder. All of these gears are similar, hence they are similarly numbered and only one is described (see Fig. 5).

The link 85 is pinned to a swinging arm 86 which is pivoted at the point 87 upon the same axis as the valve lifting arm 88 which is provided with a latch nose 89. Pivoted at 91 on the swinging lever 86 is a latch member 92 which has a nose adapted to engage the nose 89 so that when the swinging link 86 moves downward the latch 92 will engage the nose 89 and swing the arm 88 upward.

The latch member 92 has a tail 93 which is positioned on the axis of the fulcrum 87 and is tripped off at various points in the stroke of the engine by reciprocating trip member 94, which will be driven as hereinafter explained. The lifter member 88 has thrust connection with a plunger 95 which is connected to the stem of the inlet valve 96. This valve is urged in a closing direction by a spring 97. The swinging arm 86 is further connected by a link 98 to a rock arm 99 and this has a thrust connection with the plunger 101 which is connected to the stem of the exhaust valve 102. A spring 103 urges the exhaust valve in a closing direction.

It will be observed that the reciprocation of the link 85 opens the inlet and exhaust valves in proper timed relation and that the action of the member 94 will determine the point of cut-off of the inlet valve.

The motion for the trip member 94 is derived from the arms 73 and 74, that for the port engine being taken from the arm 73 and that for the starboard from the arm 74. As the mechanisms are the same for the two engines only one will be described and differentiation between the port and starboard engines seems unnecessary.

The driving connection is a link 104 pivoted to the arms 73, 74, as the case may be, and this drives a pendant lever 105 which is pivoted on a rock shaft 106. Pivoted at or near midlength of each of the arms 105 is a three-arm bell crank lever 107. Two opposed arms of this bell crank are connected by corresponding links 108, with one arm of respective bell cranks 109. The other arm of each bell crank 109 is connected by a corresponding link 111 with the corresponding trip member 94. The time of cut-off is adjusted by swinging the three-arm bell crank 107, the effect being to lower or raise the members 94.

Simultaneous adjustment of all four members 94 is effected by rotating the rock shaft 106. This shaft carries fixed upon it two arms 112, one for the port cylinder and the other for the starboard cylinder. Each arm 112 is connected with the third arm of the corresponding bell crank 107 by a link 113. The shaft 106 is urged in a clockwise direction (as viewed in Figs. 4 and 6) by weight 114 which is mounted on an arm 115 projecting to the right from rock shaft 106.

The downward limit of motion of the arm 115 is determined by an adjustable stop 116, and when the arm 115 is swung clockwise as far as is permitted by the stop 116, the trips 94 are set for the shortest cut-off, that is, they are in their lowest position. Raising of the lever 115, that is, turning it in a counterclockwise direction through a slight range, raises the members 94 and lengthens the cut-off.

As explained in the general description of the control cycle, it is desired to shorten the cut-off as the control device moves from "Stop" to or near "Half speed" position, then leave the cut-off unchanged to "Full speed" position, and then from "Full speed" to "Overload" to slightly lengthen the cut-off. This function is performed by rocking lever 117 mounted on a rock shaft 118 and connected by link 119 with the crank 47. The lever 117 has two projecting lugs 121, 122, on opposite sides of its shaft 118, and each underlying the lever 115. When the crank 47 is in its "Stop" position, that is, horizontal to the left, (see Fig. 3) lever 117 is drawn to the left and the lug 122 lifts the lever 115. The parts are so proportioned as to give the maximum desired cut-off in this setting.

As the crank 47 swings in either direction from the "Stop" position, lever 117 will be moved to the right, and at, or shortly before, "Half speed" position is reached the lever 115 will have been arrested by the stop 116 in the minimum cut-off position and will have been cleared by the lug 122. From this position on to "Full speed" position, in either direction, the lever 115 remains undisturbed.

However, if the crank 47 be shifted beyond "Full speed" position into the "Overload" range, the arm 117 will again lift the lever 115, slightly lengthening the cut-off. The lug 121 starts to engage lever 115 at "Full speed" position, so that the lengthening of the cut-off commences as the overload commences, and continues progressively for the range of the "Overload" setting.

The lever 117 projects downward beyond the rock shaft 118 and is connected by a link 123 with a control lever 124 of a servo-motor which in "Stop" position operates to unload the compressor by holding open the inlet and exhaust valves of the air motors.

This servo-motor includes a cylinder 125 with a differential piston 126, not unlike the piston 52. The annular space 127 is constantly under hydraulic pressure, arriving through the pipe 128, valve chamber 129 and passage 131. The piston 126 is connected by a lug 132 with the lower end of the lever 124, which thus serves to combine the motion of the piston 126 and the link 123.

The lever 124 is connected at an intermediate point with a link 133 which extends to a valve actuating arm 134. This is pinned to the stems 135 and 136 of an inlet valve 137 and an exhaust valve 138. A spring 139 tends to seat both valves.

If the upper end of the lever 134 is moved to the left the lever fulcrums on the valve stem 135 and unseats the valve 137. If it is swung to the right, the valve 137 remains seated, and the valve 138 is unseated. If the admission valve 137 opens the space 141 in cylinder 125 receives pressure, and as this acts over the entire area of piston 126, the effect is to move the piston to the right in opposition to the same pressure acting in the annular space 127. Space 127 is constantly under pressure, and it follows that the release of pressure fluid from the space 141 by the valve 138 causes the piston 126 to move to the left. The action of the combining lever 124 is to cause the piston 126 to follow the motions of the link 123, but in the reverse direction.

Piston 126 is connected by lug 132 and a related link 142 with an arm 143 fixed on a rock shaft 144. Fixed at opposite ends of the rock shaft 144 are two-armed bell cranks 145. One arm of each bell crank 145 is connected by a link 146 with the corresponding arm of a parallel bell crank 147. The remaining arms of the two bell cranks 145, 147, are connected to vertical links 148. One link 148 handles the head end unloading gear and another the crank end unloading gear.

This unloading mechanism can be best understood by reference to Fig. 5. The four gears for both ends of the two cylinders are identical. The link 148 is connected to one arm of a bell crank 149, whose other arm is connected by a link 151 with a second bell crank 152. The first bell crank 149 has a third arm 153 which, when the link 148 is drawn upward to the extremity of its motion, engages and lifts the plunger 95 connected to the inlet valve, thus opening the inlet valve.

In this position of the parts the bell crank 152 will be shifted to the limit of its motion and will engage the plunger 101 and hold the valve 102 open. The parts are so arranged that when crank 47 is in its "Stop" position, link 123 will be drawn as far as it can move to the right. Piston 126 will therefore have moved to the limit of its motion to the left, drawing link 148 upward to its limiting position in which the valves 96 and 102 are unseated. A very slight motion of the crank 47 away from "Stop" position will shift the lever 117, and consequently the link 123, sufficiently to render the unloading gear inoperative. It requires a slight range of motion near the "Stop" position to shift the lever 49 and cause the servo-motor piston 52 to function to set the valve gear for forward or rearward motion. This slight motion is also sufficient to cause the necessary operation of the unloading gear.

The above description will make clear the construction of the reverse mechanism, the variable cut-off mechanism and the unloading gear mechanism, all of which are applied to the air engine.

Control of the Diesel engine will now be described with reference to the left hand portion of Fig. 3.

The crank 47 is connected by a link 155 with an arm 156 of a bell crank, whose other arm, 157, is connected to the fuel controlling means and to a loading device for the speed governor. The arm 156 is longer than the crank 47, so that its angular movement is less than the angular movement of the crank. The arm 157 has connected to it a link 158 which rotates a sort of spiral cam 159 pivoted at 161, by means of an arm 62. The cam 159 is in thrust relation with a roller 163 on a longitudinally movable spring seat 164. The spring seat 164 supports one end of a loading spring 165, whose other end bears against the governor collar 166, urging this to the right in opposition to the centrifugal effect of the governor weights 167.

The connection between the weights 167 and the collar 166 consists of forked arms 168, rigid with the weights, and in thrust relation with the collar. It will be understood that the governor is rotated by the engine at engine speed or at a proportional speed. The common practice in Diesel engines is to mount the governor on the cam shaft used to actuate the fuel injecting valve. It is immaterial how it is driven.

The fuel feeding pump mechanism, generally indicated by the numeral 19, is shown in section in Fig. 3, and the plane of section is indicated by the line 3—3 on Fig. 2. This transverse vertical section is taken through the axis of one of the pump units, and it is to be understood that there is one of these units for each cylinder and that they are all controlled in unison according to known practice in the Diesel engine art. This pump is driven by the engine in timed relation, and in the example illustrated the shaft of the pump is the engine cam shaft. This is indicated by the numeral 169 and the same numeral is applied to the shaft of the governor, since in the example chosen for illustration we are assuming that the governor is on the cam shaft.

The cam shaft 169 carries a plurality of eccentrics 171, one for each pump mechanism. These are angularly spaced according to the crank spacings of the various cylinders, as is well understood, so that they deliver fuel in proper timed relation to the injecting valves.

Coacting with each eccentric 171 is a thrust block 172 which is pinned to a cross-head 173. This cross-head is urged downward by a thrust spring 174 and is connected with a plunger 175 of the fuel oil pump. The chamber 176 above the plunger 175 is in communication with the interior of a valve cage 177. Fuel oil is supplied through a manifold passage 178 and flows thence to the inlet valve 179. This seats upward and is held closed by a spring 181.

There are two discharge valves in tandem, and these are indicated at 182. They are urged closed by a spring 183 and oil flowing past these discharge valves is conducted by pipe 184 to the corresponding fuel injecting nozzle 17. Measurement of the fuel delivery is secured by holding the inlet valve 179 open for longer or shorter periods during the initial portion of the upward or displacing stroke of the plunger 175.

This type of regulation is well known in the art. The mechanism for effecting it is, in the example illustrated, constructed as follows:

A shaft 185 carries eccentrics 186, one for each pump, and on these eccentrics are journaled levers 187. These levers have thrust rollers 188 which run on the lower sides of the corresponding cams 171 and are held in thrust relation with the cams by respective springs 189. Each lever 187 is connected by a reach rod 191 and rocker 192 with a thrust spindle 193 which is longitudinally movable in guides and which projects into the inlet passage of a corresponding pump in position to strike and unseat the inlet valve 179.

It will be observed that as the plunger 175 moves upward the lever 187 and the rocker 192 will simultaneously swing in a clockwise direction, thus allowing the spindle 193 to be retracted. This permits the inlet valve to close some time during the upstroke of the plunger 175 and the time is determined by rotating the shaft 185 thus raising or lowering the eccentrics 186 and by shifting the fulcrum of the rockers 187, changing the timing of the spindle 193 relatively to the plunger 175.

Downward motion of the eccentric 186, that is, clockwise rotation of the shaft 185, allows the inlet valve 179 to close earlier, and, consequently increases the rate of feed of fuel oil. The shaft 185 is urged in a clockwise direction by the weight 194 on horizontal arm 195. The arm 195 has a pin and slot connection 196 with a link 197 connected to the arm 157. It follows that the arm 157 limits the downward motion of the arm 195 but permits the arm to be lifted by the governor in case the engine exceeds proper speed. Normally the arm 195 rests in the end of the slot 196, as indicated in Fig. 3, so that the engine is controlled from the crank 47, but if the engine exceeds the speed determined by the governor under the load existing at that time, the governor takes charge and cuts down the fuel. The connection by which this is effected includes a lever 198 pivoted at 199 and having a fork engaging the governor collar 166 in the usual manner.

The opposite end of the lever 198 is connected by link 201 to an arm 202 which is rigidly connected to the shaft 185 and projects downward therefrom. The connection between the link 201 and the arm 202 is shown at 203 and is of the lost motion or pin and slot type, so that the governor takes control only at a certain limiting position. On excessive speed the lever 198 turns counterclockwise, and draws the arm 202 to the right against the resistance of weight 194. At this time the pin and slot connection at 196 permits the necessary motion of the shaft 185.

The part indicated generally at 204 is an ordinary hand operating plunger for initially charging the fuel valves when the engine is at rest.

*Operation*

Assume that the gear is in the "stop" position, the crank 47 horizontal to the left, crank 46 vertically downward, and the Diesel engine running. In this position the shaft 185 will be rotated counterclockwise to idling position to furnish the minimum fuel to the engine, and the cam 159 will be rotated clockwise to reduce the loading of the spring 165 to the minimum so that the governor operates to limit the speed of the engine to a low-idling speed. The piston 126 will be at its leftward limit of motion, holding the inlet and exhaust valves of the air engine open and the piston 52 will be in an indifferent condition, that is, the reverse gear would be set for forward or reverse running, according to the last condition prior to stoppage.

If the controller be shifted a slight distance in either direction from the "stop" position, the first effect is to shift lever 49 in one direction or the other by the motion of crank 46. It follows that the piston 52 responds and sets the valve gear for forward or reverse rotation of the air motor. At the same time the crank 47 shifts the lever 117 far enough to affect the piston 126 and causes this to move slightly to the right, that is, far enough to retract the unloading levers from the inlet and exhaust valves. Further movement of the controller has no effect on the piston 52. It causes progressive movement of piston 126 to the right, but the accompanying motion of the unloading gear is without function as the unloading cams are simply moved further and further away from operative position.

With the valve gear set for rotation in one definite direction and the unloading terminated, the operation of the Diesel engine and its connected pump, is to establish a relatively low differential between the pressures existing in the pipes 22 and 26. At first this may be of the order of fifty pounds. This follows from the fact that the Diesel engine is operating at low speed and the air engines start in operation with a maximum cut-off, thus using relatively large quantities of air. Continued motion of the controlling shaft 43, in the assumed direction, increases the fuel feed, and at the same time progressively loads the governor, thus causing the Diesel engine to increase in speed and power and to deliver more air to the high pressure line 22. This progressive increase in speed continues to the limit of the "overload" position.

Up to "half speed" position, or thereabout, the lug 122 progressively lowers the lever 115 until the minimum cut-off is reached, when the weight 114 rests on the stop 116. At this time the Diesel engine will not have reached its full normal speed, but will be operating at say about half speed, and the pressure differential between the pipes 22 and 26 will have increased materially because the pump is delivering more air and the air motor cylinders are using less air because of the shortened cut-off.

From the point where minimum cut-off is reached up to "full speed" the speed control is effected merely by further increasing the speed of the Diesel engine, thus causing the pump to furnish air at increasing rate. Under these conditions the standard pressure differential between the pipes 22 and 26 is established and maintained.

There are occasions when it is desirable to avail of the overload capacity of the Diesel engine for short periods, despite the fact that this power is not as economically applied.

The Diesel engine is overloaded by increasing the fuel feed, and consequently the engine speed. The air engines handle the resulting increased output of the compressor because their cut-off is lengthened. This function of lengthening the cut-off is performed by the lug 121 which engages the lever 115 at "full speed" position and lifts this lever somewhat as the gear is adjusted beyond "full speed" position into the "overload" range.

Controlling installations such as outlined have several important advantages. The power plant is controlled, throughout its entire speed range of forward and reverse running, from the pilot house. The pneumatic transmission, when properly designed, is slightly more efficient than any electrical transmission yet available, weighs less, and gives a more flexible control. Moreover, it is more readily adapted to certain standard types of apparatus, notably, tow-boats and locomotives, than is the electrical transmission.

While the mechanism as applied to tow-boats has been described in considerable detail, it is obvious that other installations will require modifications, but these can be made within the scope of the present invention. For example, there is a wide range of selection in valve gears, to permit both reversal and variable cut-off. There are various specifically different ways in which the compressor can be unloaded, though it appears to be simplest to unload it by short-circuiting the air flow through the air motors. It is obvious, however, that any unloading gear might be operated by the piston 126, or some equivalent mechanism.

The invention is applicable in certain of its features to different fuel feeds designed to meet the requirements of particular cases. Furthermore, I have illustrated a strictly mechanical connection as the remote pilot house control. However, various remote control mechanisms are known, some of which are not strictly mechanical, and I contemplate the use of any controller capable of application so that the motion of a handle or the like, at a control station, will produce a similar motion of a controller in the engine room, or other proper location.

In other words, the description is intended to be explanatory, and not limiting, the scope of the invention being expressed in the claims.

What is claimed is,—

1. The method of varying the speed and power output of a power plant of the type including a variable cut-off expansible chamber motor connected in a closed circuit with a compressor which is driven at variable speed by a prime mover, which consists in changing the speed of the prime mover and compressor and simultaneously varying inversely the length of cut-off of the expansible chamber motor through the lower speed ranges; and in the higher speed ranges maintaining the cut-off of the expansible chamber motor at substantially the minimum value and varying the speed of the prime mover and compressor.

2. The method of varying the speed and power output of a power plant of the type including a variable cut-off expansible chamber motor connected in a closed circuit with a compressor which is driven at variable speed by a prime mover, which consists in changing the speed of the prime mover and compressor and simultaneously varying inversely the length of cut-off of the expansible chamber motor through the lower speed ranges; in the higher speed ranges maintaining the cut-off of the expansible chamber motor at substantially the minimum value and varying the speed of the prime mover and compressor; and in overload ranges further increasing the speed of the prime mover and compressor and simultaneously increasing the cut-off of the expansible chamber motor.

3. The method of varying the speed and power output of a power plant of the type including a variable cut-off expansible chamber motor connected in a closed circuit with a compressor which is driven at variable speed by a prime mover, which consists in changing the speed of the prime mover and compressor and simultaneously varying inversely the length of cut-off of the expansible chamber motor through the lower speed ranges; in the higher speed ranges maintaining the cut-off of the expansible chamber motor at substantially the minimum value and varying the speed of the prime mover and compressor; and stopping the expansible chamber motor by unloading said compressor while said prime mover is operating at low speed.

4. The combination with a power plant including a prime mover having an energy input controller, a compressor driven by said prime mover and an expansible chamber motor deriving its motive fluid from said compressor and having a variable cut-off mechanism, of a single actuating means operatively connected to said energy input controller and to said variable cut-off mechanism.

5. The combination with a power plant including a prime mover having an energy input controller, a compressor driven by said prime mover, an unloading mechanism for said compressor, and an expansible chamber motor deriving its motive fluid from said compressor and having a variable cut-off mechanism, of a single actuator operatively connected to said energy input controller, said unloading mechanism and said variable cut-off mechanism.

6. The combination with a power plant including a prime mover having an energy input controller, a compressor driven by said prime mover, an unloading mechanism for said compressor, and an expansible chamber motor deriving its motive fluid from said compressor and having a variable cut-off mechanism and a reversing mechanism, of a single actuator operatively connected with said energy input controller, said unloading mechanism, said variable cut-off mechanism, and said reversing mechanism.

7. The combination with a power plant including a prime mover having an energy input controller, a compressor driven by said prime mover, and an expansible chamber motor deriving its motive fluid from said compressor and having a variable cut-off mechanism, of a single actuator operatively connected with said energy input controller and variable cut-off mechanism, said actuator operating to increase the energy input progressively when moved from a stop position to full speed position and serving simultaneously to shorten the cut-off progressively to about half speed position, and thereafter to maintain the cut-off substantially constant to full speed position.

8. The combination with a power plant including a prime mover having an energy input controller, a compressor driven by said prime mover, an unloading mechanism for said compressor, and an expansible chamber motor deriving its motive fluid from said compressor and having a variable cut-off mechanism and a reversing mechanism, of a single actuator operatively connected with said energy input controller, unloading mechanism, variable cut-off mechanism and reversing mechanism, said controller having a stop position from which it is shifted for forward or reverse running and in which said unloading mechanism is caused to function, the actuator serving to operate the reversing mechanism in one or the other direction as it is moved in opposite direction from said stop position, and serving when moved from stop position in either direction to progressively shift said energy input controller to gradually increase the energy input up to full speed position, and at the same time to actuate said variable cut-off mechanism to shorten said cut-off to about half speed position, and thereafter to maintain the cut-off substantially constant from half speed to full speed position.

9. A power plant comprising in combination, a Diesel engine having a fuel feed controller; a compressor driven by said engine; an expansible chamber motor connected in closed circuit with said compressor and having a variable cut-off mechanism; and a single actuating means operatively connected to said fuel feed controller to vary the fuel feed progressively throughout the control range, and operatively connected to said valve cut-off mechanism to shorten the cut-off as the speed increases to substantially half speed, and from half to full speeds to maintain the cut-off substantially constant.

10. A power plant comprising in combination, a Diesel engine having a fuel feed controller; a compressor driven by said Diesel engine; an expansible chamber motor connected in closed circuit with said compressor and having a variable cut-off valve gear, and an unloading means arranged to hold the inlet and exhaust valves of the expansible chamber motor open simultaneously; and a single actuator operatively connected to said fuel feed controller, said variable cut-off valve gear and said unloading means, and having a stop position in which said unloading means is rendered active, and a controlling range of motion in which said fuel feed controller is actuated to increase the fuel feed progressively and in which the valve gear is shifted to shorten the cut-off as the fuel feed is increased until substantially half speed is reached, and from substantially half to full speed is held at a constant setting to maintain said cut-off constant.

11. A power plant comprising in combination a Diesel engine having a fuel feed controller; a compressor driven by said Diesel engine; an expansible chamber motor connected in a closed circuit with the compressor, and having a variable cut-off mechanism and a reverseing mechanism; means for unloading said compressor; and a single actuator operatively connected with said fuel feed controller, said variable cut-off mechanism, said reversing mechanism and said unloading mechanism, said controller having a stop position in which said unloading mechanism is caused to operate, and being movable in reverse directions from said stop position first to actuate said reversing mechanism and then to operate simultaneously the fuel feed and variable cut-off mechanism first to increase the fuel feed and shorten the cut-off and thereafter further to increase the fuel feed while maintaining the cut-off substantially constant.

12. In a power plant, the combination of a Diesel engine having a fuel feed controller; a compressor driven by said engine; an expansible chamber motor connected in closed circuit with said compressor and having a reversing mechanism and a variable cut-off mechanism; means for unloading said compressor; a servo-motor for operating said unloading means; a servo-motor for operating said reversing means; control valve mechanisms for said servo-motors; and a single actuator having a stop position and progressive speed controlling positions on opposite sides of said stop position, said actuator being connected to actuate the valve mechanisms of said servo-motors at the stop position, said actuator having a direct connection with said fuel feed controller and a lost motion connection with said variable cut-off mechanism.

13. The combination with a power plant including a prime mover having an energy input controller, a compressor driven by said prime mover, and an expansible chamber motor deriving its motive fluid from said compressor and having a variable cut-off mechanism, of a speed responsive governor driven by said prime mover and having a lost motion connection with said energy input controller whereby the governor will control the prime mover to limit excess speed; a single manually actuated means normally effective to control said energy input controller but capable of being superseded in control by said governor under overspeed conditions, said actuating means being operatively connected with said variable cut-off mechanism to actuate the same to vary the cut-off.

14. A power plant comprising in combination, a Diesel engine having a fuel feed controller; a compressor driven by said Diesel engine; an expansible chamber motor connected in closed circuit with said compressor having a distributing valve gear of the variable drop cut-off type and an unloading gear arranged to hold the inlet and exhaust valves of the expansible chamber motor open simultaneously; and a single actuator operatively connected with said fuel feed controller, with the drop cut-off mechanism of said valve gear and with said unloading means, and having a stop position in which said unloading means is rendered active, and a speed controlling range of motion in which said fuel feed controller and said drop cut-off gear are adjusted in a definite relation to each other.

15. In a power plant, the combination of a Diesel engine having a fuel feed controller; a compressor driven by said engine; an expansible chamber motor connected in a closed circuit with said compressor and having a reversing mechanism and a variable drop cut-off distributing valve mechanism; unloading means independent of said distributing valve mechanism for holding the inlet and exhaust valves of said expansible chamber motor open simultaneously; a servo-motor for operating said unloading means; a servo-motor for operating said reversing mechanism; control valve mechanisms for said servo-motors; and a single actuator having a stop position and progressive speed control positions on opposite sides of said stop position, said actuator being connected to actuate the valve mechanisms of said servo-motors at the stop position, and having connections with said fuel feed controller and said drop cut-off mechanism to control the same in a fixed relation with each other.

16. The combination with a power plant of the type including a variable cut-off expansible chamber motor connected in a closed circuit with a compressor, and a variable speed prime mover connected to drive said compressor, of means for varying the speed of the prime mover through its entire speed range, and associated means for controlling the length of cut-off of the expansible chamber motor, said associated means being operable in the lower speed ranges of said prime mover to vary the cut-off of the expansible chamber motor in inverse relation to the speed of the prime mover, said associated means being maintained in substantially the minimum cut-off position when said speed controlling means of the prime mover is set for the higher speed ranges of the prime mover.

17. The combination with a power plant of the type including a variable cut-off expansible chamber motor connected in a closed circuit with a compressor, and a variable speed prime mover connected to drive said compressor, of means for varying the speed of the prime mover through its normal range, and an overload range, and associated means for controlling the cut-off of the expansible chamber motor, said associated means being operable in the lower speed ranges of said prime mover to vary the cut-off of the expansible chamber motor in inverse relation to the speed of the prime mover, and in the higher normal speed ranges being maintained in substantially minimum cut-off position, and in the overload ranges being operable to increase the cut-off of the expansible chamber motor.

18. The combination with a power plant of the type including a variable cut-off expansible chamber motor connected in a closed circuit with a compressor, and a variable speed prime mover connected to drive said compressor, of means for controlling the speed of the prime mover between an idling speed and its normal full speed, means operable in the idling position of said speed controlling means for unloading said compressor, and means associated with said speed controlling means, and operable in the lower speed ranges to vary said cut-off in inverse relation to the speed of the prime mover, and in the higher speed ranges to maintain said cut-off substantially at the minimum value.

RUDOLF WINTZER.